United States Patent [19]

Leiber

[11] Patent Number: 4,903,487
[45] Date of Patent: Feb. 27, 1990

[54] HYDRAULIC BRAKE BOOSTER INCLUDING A TRACKING VALVE

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 869,818

[22] Filed: May 30, 1986

Related U.S. Application Data

[63] Continuation of Ser. No. 653,622, Sep. 24, 1984, abandoned.

[30] Foreign Application Priority Data

Oct. 13, 1983 [DE] Fed. Rep. of Germany ........ 3337275

[51] Int. Cl.$^4$ .............................................. B60T 13/14
[52] U.S. Cl. ..................................... 60/547.1; 91/374; 91/376 R
[58] Field of Search .................. 60/547.1, 548, 551, 60/554; 91/391 R, 374, 398, 419, 469, 376 R

[56] References Cited

U.S. PATENT DOCUMENTS 3,728,942  4/1973  Brown .................................. 91/469
4,244,185  1/1981  Belart .................................. 60/550

OTHER PUBLICATIONS

*Hydraulic Handbook*, 2d ed., Trade and Technical Press, Ltd., publishers, Surrey: England, 1960, p. 98.

Primary Examiner—Randall L. Green
Assistant Examiner—George Kapsalas
Attorney, Agent, or Firm—Edwin E. Greigg

[57] ABSTRACT

A hydraulic brake booster is proposed, in which a coupling is provided between a control valve and a booster piston. The coupling engages the control valve at a slide sheath and upon the movement of the booster piston causes it to move as well, in such a manner that tracking control is provided. A pedal push rod in this manner always keeps a certain distance from the booster piston; that is, it does not touch it. However, if the auxiliary force should fail, then the pedal push rod does touch the booster piston, and its force is transmitted mechanically.

4 Claims, 1 Drawing Sheet

HYDRAULIC BRAKE BOOSTER INCLUDING A TRACKING VALVE

This is a continuation of copending application Ser. No. 653,622 filed Sept. 24, 1984.

BACKGROUND OF THE INVENTION

The invention relates to a hydraulic power control device especially for a vehicle powered braking system, having yielding lever means. The lever means comprise an arm pivotally mounted on a first axle secured to the device housing, and a feeler member pivotally mounted on a second axle, said second axle being pivotally mounted on the arm, the ends of the feeler member cooperating with spool valve and a servomotor piston respectively, the connection between the arm and the housing being yieldable in case of excessive stresses applied on a push rod engaging the free end of the arm. A brake booster of this kind is known from the disclosure of Carre U.S. Pat. No. 3,805,671.

In this known brake booster, the slide sheath is disposed firmly in the housing. This has the disadvantage that the control valve is not trackable by simple means. Instead, a special spring lever is required in order to attain this tracking. A spring lever of this kind, however, is quite delicate and vulnerable to failure.

OBJECT AND SUMMARY OF THE INVENTION

The hydraulic brake booster having the characteristics of the invention disclosed herein has the advantage over the prior art that reliable tracking of the control valve is attained without special means. A further advantage is the short structure. Finally, it is advantageous that by coupling the slide sheath of the control valve to the booster piston, free movement between the pedal push rod and the booster piston is possible. The result is a variable translation ratio, which means that when the supply of energy is intact the booster piston overtakes the pedal push rod and generates a high pressure at a relatively slight amount of pedal movement. If the servo force fails, a direct actuation of the booster piston is effected by means of the pedal push rod.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
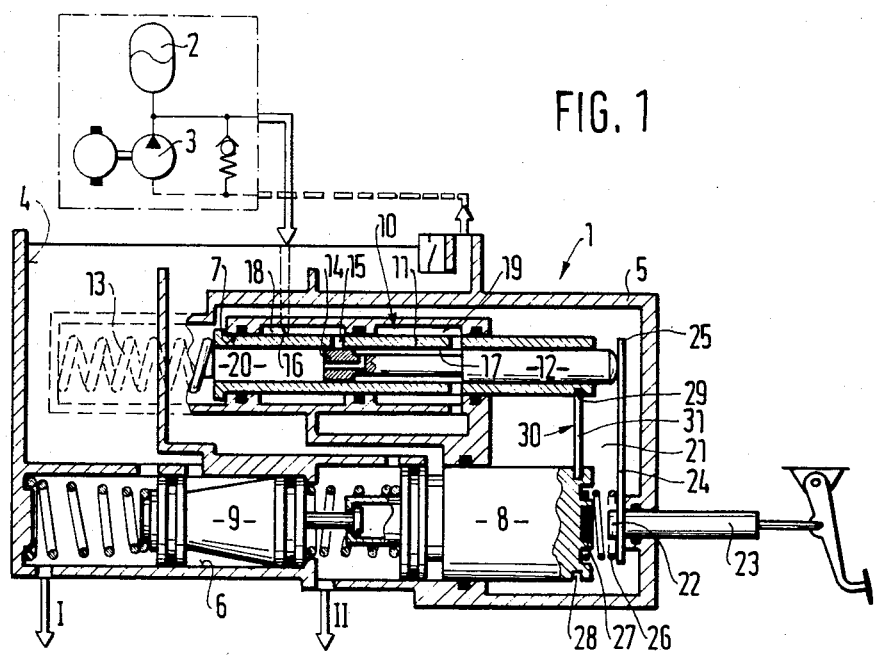
FIG. 1 shows generally in cross-section an embodiment of the invention having a coupling not supportedly attached to the housing.

A hydraulic brake booster is disposed between a pump 3 combined with a reservoir 2, serving as an energy supply means 2, 3 and a refill container 4 in a housing 5 of the brake booster 1, on one side, and two brake circuits I and II on the other; the brake circuits include the wheel brake cylinders, not shown.

In the housing 5 of the brake booster 1, two multiply-stepped bores 6 and 7 are provided parallel to and beside one another. In the one bore 6, a booster piston 8 functioning as the first main cylinder bore and a second main cylinder piston 9 are provided one after the other, thus in a known manner forming a tandem main brake cylinder. A control valve 10, which comprises a slide sheath 11 and a slide 12 inserted into the sheath, is disposed in the other bore 7.

The slide sheath 11 is supported against the housing by a helical spring 13 of a conventional type. The slide 12 has a control head 14, with which it can travel past a radial control bore 15 in the slide sheath 11, in order either to close or to open a line connection 16 for supplying energy. An annular pressure change chamber 17 is disposed to the right of the control head 14. This chamber 17 can be connected with either of two annular chambers 18 and 19 in the slide sheath 11, that is, one annular chamber 18 for pressure connection and one annular chamber 19 for pressure relief. The control head 14 is bored longitudinally all the way through and is connected at one end to the pressure change chamber 17 and at the other to a chamber 20 disposed at the front end ahead of the control head 14; this chamber 20 is thus arranged to communicate via housing conduits with a pressure chamber 21 located on the right of the booster piston 8 and on the right of the control valve 10.

The inner end 22 of a pedal push rod 23 dips into this pressure chamber 21, the pedal push rod 23 being generally disposed coaxially with the booster piston 8. The pedal push rod end 22 has an arm 24, which is capable of acting upon the slide 12 with its free end 25. The pedal push rod 23 is supported with respect to the booster piston 8 via a spring 26. The booster piston 8 has an elastic cushion 27, against which the inner end 22 of the pedal push rod can apply itself as appropriate. It is also possible, however, for the cushion 27 to be secured instead to the pedal push rod end 22.

The booster piston 8 has an annular groove 28, and the slide sheath 11 has a groove 29, and a coupling 30 is inserted into both grooves 28 and 29. The coupling 30 comprises a plate 31 supported by the booster piston 8.

Mode of Operation

In the position of rest of the brake booster 1, the pedal push rod 23 is held in its outset position via the spring 26. During normal braking, the slide 12 is moved along by the pedal push rod 23, the control valve 10 is switched over, and the increasing pressure in the pressure chamber 21 displaces the booster piston 8 and the piston 9 in the braking direction. The pedal push rod 23 does not touch the cushion 27 at this time; that is, a certain minimum distance between the pedal push rod 23 and the booster piston 8 is maintained.

The booster piston 8 moves the slide sheath 11 with it via the coupling 30, so that the control valve 10 tracks or replicates the movement of the booster piston 8. The brake pressure introduced into the system has a feedback effect upon the pedal push rod 23, and a middle position is thereby established at which the actuation force exerted upon the pedal push rod 23 by the driver's foot is in equilibrium with the power-assist force. The decrease in volume in the two chambers ahead of the pistons 8 and 9 in each case determines the pedal deflection, as in the case of previously known brake boosters.

Should the auxiliary force fail, then the pedal push rod 23 is applied via the cushion 27 to the booster piston 8, and braking occurs without auxiliary force. The cushion 27 serves as a stop damper and travel-limiting spring when the pedal push rod 23 comes into contact with the booster piston 8.

Figure 2:
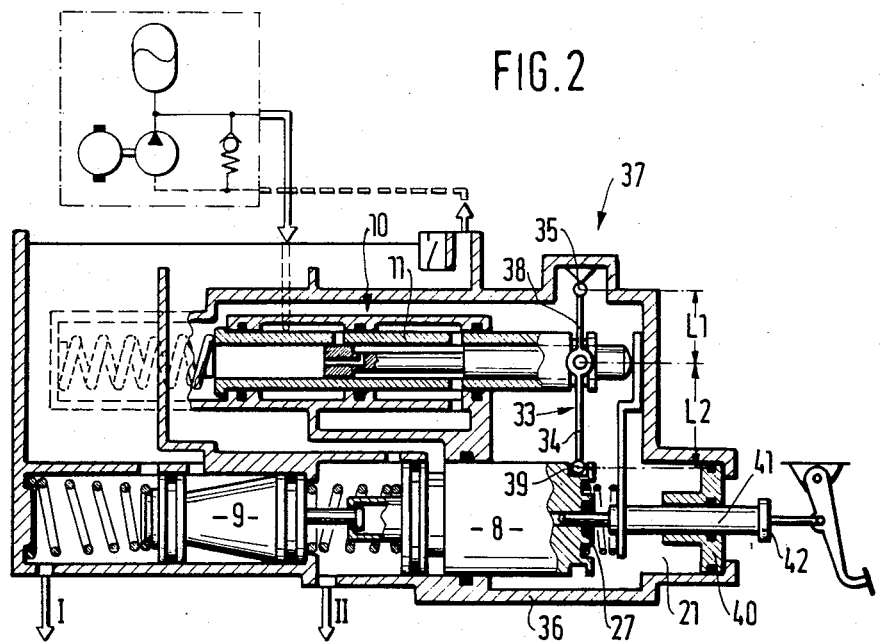
FIG. 2 shows another generally cross-sectional view of the same structure but with a coupling supportedly attached to the housing.

FIG. 2 shows a structure substantially identical with that of FIG. 1, except that in this case a lever, acting as the coupling means, is supported on the housing of the brake booster. Also, the housing 36 in this case is closed off with respect to the pedal by a movable annular piston 40. Corresponding elements are identified by the same reference numerals in both FIGS. 1 and 2.

Here a single-arm lever 34 is provided as the coupling 33, being supported on a pivot point 35 in a housing 36 of a brake booster 37. The lever 34 engages the slide sheath 11 in a medial area 38, and at its free end 39 the lever 34 is pivotably supported on the booster piston 8. In this manner, a lever ratio of L1 to L2 is realized, and this lever ratio L1/L2 determines the pedal force and the jump in translation in the event of a failure of the auxiliary force. The slide sheath 11 is disengaged from the lever 24 at this time, with the result that—with the same pedal travel-main cylinders with smaller diameters than in conventional boosters can be used. Yet small main cylinders guarantee a larger translation jump.

A pedal push rod 41 is provided with a stop collar 42 and is supported in an annular piston 40 which closes off the pressure chamber 21 from the outside.

If the brake booster 37 is actuated to the full extent, the stop collar 42 rests on the annular piston 40. Then the brake pedal becomes quite hard. This is desirable in order to provide the driver with an indication of the full braking force being exerted (highly progressive force increase). The use of the cushion 27 improves the transition to the "hard" pedal.

By fixing the lever 34 at one side on the housing 36 and by its central articulation on the slide sheath 11 and its engagement with the booster piston 8, an advantageous, non-linear transmission function is attained.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake booster for motor vehicles having a housing (5), a booster chamber in said housing, a control valve (10) in said housing disposed at least generally parallel to and beside said booster chamber for monitoring a pressure connection of said booster chamber with said control valve, said booster chamber is defined by a booster piston (8) which is disposed at least generally in axial alignment with a pedal push rod to control a brake circuit fluid pressure, said control valve (10) further comprising a slide (12) and a coaxial relatively movable slide sheath (11), a one piece coupling lever (31) in said housing operatively positioned for a non-pivotable fixed connection between said booster piston (8) and said slide sheath (11) for coupling said booster piston with said slide sheath for movement of said slide sheath by said booster piston in a braking and brake-actuating direction for both a translation and a tracking control between said control valve (10) and said booster piston (8).

2. A hydraulic brake booster as set forth in claim 1 which includes a control arm connected at one end to said pedal push rod and in contact with said slide for moving said slide when said pedal push rod is moved.

3. A hydraulic brake booster as defined by claim 1, further wherein a travel limiting spring and an electric cushion are provided between said pedal push rod and said booster piston, whereby in the event of booster force failure said travel limiting spring and said elastic cushion function as a stop damper for said pedal push rod.

4. A hydraulic brake booster as set forth in claim 3 which includes a control arm connected at one end to said pedal push rod and in contact with said slide for moving said slide when said pedal push rod is moved.

* * * * *